Figure 1:
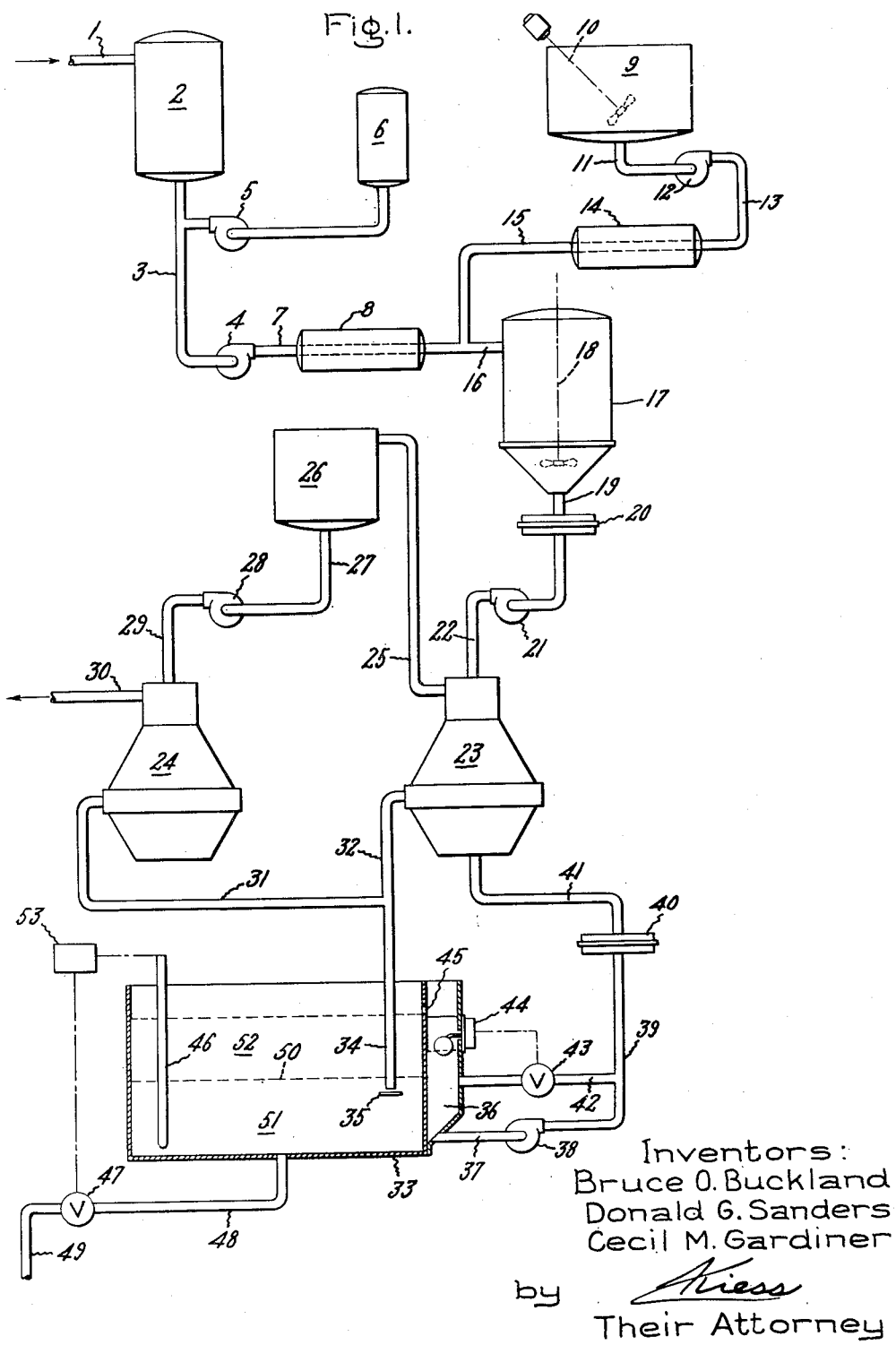

Inventors:
Bruce O. Buckland
Donald G. Sanders
Cecil M. Gardiner
by Kiess
Their Attorney Dec. 18, 1956   B. O. BUCKLAND ET AL   2,774,722
PROCESS FOR REMOVING ASH-FORMING IMPURITIES
FROM PETROLEUM RESIDUAL OILS
Filed Aug. 5, 1954   2 Sheets-Sheet 2

Inventors:
Bruce O. Buckland
Donald G. Sanders
Cecil M. Gardiner
by  Kiess
Their Attorney

United States Patent Office 2,774,722
Patented Dec. 18, 1956

2,774,722

PROCESS FOR REMOVING ASH-FORMING IMPURITIES FROM PETROLEUM RESIDUAL OILS

Bruce O. Buckland, Donald G. Sanders, and Cecil M. Gardiner, Schenectady, N. Y., assignors to General Electric Company, a corporation of New York Application August 5, 1954, Serial No. 447,954

7 Claims. (Cl. 196—44)

This invention relates to the purification of residual fuel oils and more particularly to the removal of ash forming constituents from fuel oils such as residual or still bottom oils for rendering them suitable as gas turbine fuels.

In the usual operation of a gas turbine, fuel is injected into a combustion zone and is ignited in the presence of an excess of air. The products of combustion are directed towards turbine blades having carefully designed contours whereby the energy of the gas stream is converted into rotary energy. Although it is desirable for various reasons to use cheap residual fuels, generally it has been found that the use of such fuels is extremely limited by the fact that in many instances certain metallic compounds present in the fuel form an ash and are deposited after combustion as a scale, notably on the rotor and stator blades, which with some oils is corrosive to metal parts and which decreases the efficiency of the engine necessitating the shutdown of the unit at frequent intervals for the cleaning or replacement of the blades and other dirty or damaged parts of the engine on which the scale has been deposited.

Among the fuel oils commonly employed in the firing of gas turbine equipment are petroleum residual materials known as bunker oils. Ordinarily, they are composed of materials remaining after the removal of all the lighter fractions of natural petroleum and hence contain a high concentration of substantially all of the metal compounds and other non-volatile components usually present in the original petroleum, or added during the various refining steps. It has been found that the presence of a calcium or sodium-containing compound in these oils is largely responsible for the formation of this deposit or scale and that in order to prevent the buildup of scale from reaching such a degree that it materially reduced the value of the fuel in its application to gas turbine engines, it is necessary to reduce the calcium or sodium content of the fuel to on the order of 10 parts per million, and preferably to eliminate it entirely.

Such ash forming substances have been removed in the past by water washing. However, simple water washing is not always satisfactory due to the difficulty in separating the washed oil from the water employed for the purpose. Oils of the type herein contemplated, heavy bunker oil for example, have specific gravities approaching that of water or in many cases even higher than that of water. As a result, separation processes dependent upon specific gravity, such as centrifuging or decanting are extremely difficult to accomplish when a water wash alone is used.

It is therefore an object of the present invention to provide a wash solution of the proper specific gravity which will permit an easy separation of the wash solution and the washed oils.

Another object of this invention is to provide a process for the washing and separation of petroleum residual materials.

Still another object of this invention is to provide a new and improved separatory step whereby oil retained in the waste is recovered by recycling.

Still another object of this invention is to provide an inexpensive fuel suitable for use in gas turbine engines.

According to this invention oils of the type hereinbefore described are first washed by mixing them with a liquid medium whose specific gravity has been adjusted to a value greater than the specific gravity of the oil to be washed and this mixture is then separated. The substantially purified residual oil, by virtue of its corrosiveness and ash forming capabilities being reduced by the wash, is suitable for use as a fuel in a gas turbine. A remaining sludge portion, hereinafter to be described, is sent to a settling tank where any entrained oil is removed and recycled to the treating equipment.

Figure 2:
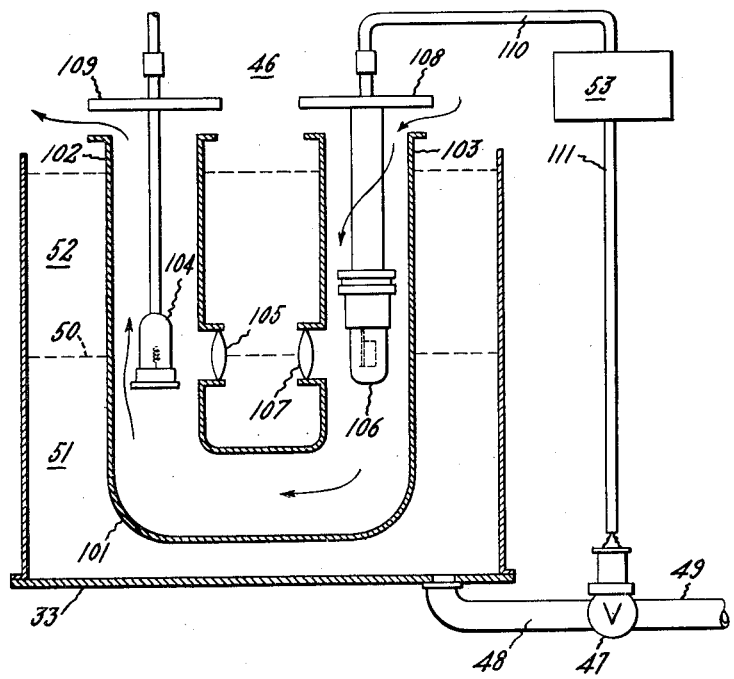

This invention will be better understood from the following description taken in connection with the accompanying drawings, in which Fig. 1 is a diagrammatic view of an apparatus embodying the invention; and Fig. 2 is a diagrammatic view of a level controller suitable for use in the sludge settling tank shown in Fig. 1.

With reference to Fig. 1 of the drawings, numeral 1 indicates a pipe for feeding the raw residual oil, bunker oil for example, to a storage tank 2 from which it is pumped through pipe 3 by pump 4 into pipe 7 which is surrounded by a heating jacket 8 where it is heated to between 180° F. and 200° F. An emulsion breaker, for instance the material known to the trade as Tretolite, is added from tank 6 by metering pump 5 at some point in line 3 before the heat exchanger, as shown, or directly into the mixing tank 17. The bunker oil then passes through pipe 16 into mixer 17 where it is mixed with the wash solution.

The wash solution is formed in tank 9 by mixing water and an alkaline earth salt in the proper proportions to give the desired specific gravity and stirring with agitator 10. Sufficient salt should be added to give the solution a specific gravity greater than that of the oil being treated. The wash solution is then pumped from tank 9 through pipe 11 by pump 12 into pipe 13 which is jacketed by a heat exchanger 14 where it is heated to approximately the same temperature as the bunker oil with which it is to be mixed. From the heat exchanger the wash solution flows through pipes 15 and 16 into the mixer 17 where it is thoroughly mixed with the bunker oil by agitator 18.

The bunker oil and wash solution mixture is fed by means of pipe 19 through a screen-filter 20 where any large solid particles are removed, and thence through pump 21 and pipe 22 into a centrifuge 23 where it is separated into an oil portion and a heavier sludge portion. The bunker oil then flows from the central portion of the centrifuge through pipe 25 through a deaerating tank 26 and then through pipe 27, pump 28, and pipe 29 into a second centrifuge 24 which removes any remaining sludge. The substantially purified oil is removed from the central portion of the second centrifuge through pipe 30 and sent to storage for eventual use; or directly to a gas turbine or other consumer. The sludge from the second centrifuge is combined with the sludge from the first centrifuge by means of pipes 31 and 32 respectively which are connected to peripheral portions of the respective centrifuges and sent to a slude separating or settling tank 33 by means of pipe 34 and distributor 35, which discharges the heavier components from both centrifuges at a level just below the "interface zone" 50. The sludge is allowed to settle in tank 33 to form an oil layer 52 and a wash-water layer 51 separated by the interface zone 50. The heavier wash layer 51 and impurities are removed from the bottom of the tank through conduit 48, which is provided with a valve 47 controlled by an interface level sensing device 46 and a suitable controller 53, and discharged to waste through pipe 49.

The top portion of oil layer 52 is decanted through opening 45 in the wall of tank 33 into chamber 36 from which it is removed through conduit 37 by pump 38 to line 39 leading to a screen-filter 40 and thence through pipe 41 into the bottom of the first centrifuge 23 where it is added to the sludge in the centrifuge.

When the level in chamber 36 drops below a certain desired minimum, level control 44 opens valve 43 and permits recycling of the oil through line 42 back into chamber 36, thereby preventing the introduction of air into pipe 39 and ultimately into centrifuge 23.

The alkaline earth salts used in the wash solution to increase the specific gravity thereof have also been shown to be of value when added to the residual oil for decreasing the corrosion caused by other metals, particularly vanadium, present in the oil and not removed by the washing process. The addition of such materials to inhibit corrosion by the vanadium compounds is more fully disclosed and claimed in the copending application of Sanders et al., application Serial No. 302,238, filed August 1, 1952, and assigned to the assignee of the present invention.

The process illustrated in Fig. 1 shows two centrifugal treatments of the oil and wash solution mixture. Actually, more than two stages of centrifugal separation might be employed, the purified lighter components from one separator going to the next, and the heavier components from all being collected by conduits 31, 32. The use of at least two centrifuges, as shown, is advantageous since the first acts as a "washing machine" to intimately contact the oil with the wash solution, the second machine acting primarily as a separator.

While alkaline earth salts, generally, are useful in the process of the invention, magnesium sulfate in the form of hydrated magnesium sulfate is preferred. A water solution of magnesium sulfate having a specific gravity of from about 1.02 to about 1.20 is employed to advantage. The concentration of magnesium sulfate can be approximately varied according to the specific gravity and viscosity of the oil being treated. An important feature of this process is that it leaves a residual amount of magnesium salts in the purified oil, which is found to have very beneficial effects in reducing corrosion by the ash. In addition to its corrosion inhibiting properties, ash resulting from combustion of oil containing magnesium salts tends to be less sticky than an ash formed from oil containing calcium salts; and while both calcium and magnesium are excellent as corrosion inhibitors, the salts of magnesium are preferred for this latter reason.

In order that those skilled in the art may better appreciate how the process of the present invention may be practiced, the following examples are given, by way of illustration and not by way of limitation. All parts and percentages are by weight.

*Example 1*

A residual oil having 60 to 95 p. p. m. sodium, 120 to 160 p. p. m. calcium, and 23 p. p. m. vanadium, with a gravity of 10.40 API was treated with an aqueous magnesium sulfate solution having a specific gravity of approximately 1.06 in the manner detailed in describing Fig. 1 of the drawings. The resulting washed residual oil contained 6 p. p. m. sodium, 15 to 30 p. p. m. calcium and 23 p. p. m. vanadium. The removal of a substantial portion of the originally present elements is obvious.

*Example 2*

A residual oil having 18 p. p. m. sodium, 6.5 p. p. m. calcium and 29 p. p. m. vanadium, with a gravity of 7.5° API was treated with an aqueous magnesium sulfate wash solution having a specific gravity of approximately 1.045 in the manner above detailed, and resulted in a treated residue having 3.6 p. p. m. sodium, 5 p. p. m. calcium and 29 p. p m. vanadium. In this example the gravity of the oil was substantially greater than that of pure water and therefore the wash solution having an adjusted gravity heavier than that of the oil was essential to complete a satisfactory separation.

*Example 3*

A residual oil having 29 p. p. m. sodium, 5 p. p. m. calcium and 10 p. p. m. vanadium with a gravity of 11.4° API was treated with an aqueous magnesium sulfate solution having a specific gravity of approximately 1.02 and a treated residual oil was obtained having 5 p. p. m. sodium, 3 p. p. m. calcium and 10 p. p. m. vanadium.

From the results of the foregoing examples, it readily can be seen that treatment of the oil in the manner of the invention substantially reduced the sodium and calcium contents to such a degree that the corrosive and ash forming tendencies of the oil was also correspondingly substantially reduced.

Note further that the amount of calcium in the oil was reduced to a point where the formation of a sticky ash is no longer a problem.

It is important for satisfactory operation of this process to maintain the interface level between the water and sludge in the settling tank at a suitable position, in order to prevent the loss of oil through the waste discharge 48, and the recycling of excessive quantities of wash solution through conduit 37 (to such an extent that excessive amounts of the sodium, or calcium, appear in the oil in discharge conduit 30). There is air and water entrained in the oil and there are oil droplets dispersed throughout the water, resulting in a rather wide "separation zone" between the water and the oil. The hereinafter described photoelectric liquid level control device has been employed and has given satisfactory results.

The liquid level control device shown in Fig. 2 and denoted generally by numeral 46 comprises a U-tube 101 immersed in the liquid in tank 33 and intercepting the interface 50 between the oil layer 52 and the water layer 51. One vertical leg 102 of U-tube 101 contains the light-projection cell 104 and the other vertical leg 103 contains the light-sensitive photocell 106. An optical system 105 and 107 between the two cells focuses the beam of light onto the photocell thereby causing operation of amplifier 53 which is connected to the photocell through conduit 110 and is connected to an electrically operated valve 47 through conduit 111. Brackets 108 and 109 support the photocell and projection cell respectively. As long as the interface is above the location of the horizontal light beam, the beam travels through the water phase, which is relatively transparent, and sufficient light is transmitted to permit operation of the photocell and amplifier, thereby causing the valve 47 to remain open, resulting in the discharge of the water layer 51 through pipes 48 and 49. The oil layer 52 is sufficiently opaque to prevent the transmission of enough light therethrough to result in operation of the photocell; and therefore, when the interface level is below the location of the light beam, the valve 47 is closed preventing the discharge of the water layer.

A particular advantage of this U-tube interface level control device is that the heat given off by projection lamp 104 rises and creates a convection current of cool air down through vertical leg 103, past the phototube 106, and up through vertical leg 102 past the projection lamp, thereby cooling the entire device, without necessitating the use of an external cooling means for such purposes.

Various uses of the process other than those described above may be made; and it may be said in general that the invention is applicable to all oils containing impurities which either (*a*) are water soluble, in the condition in which they occur in the oil; or (*b*) can be rendered water soluble by ion exchange with the salts used in the aqueous wash solution; or (*c*) are crystalline compounds substantially insoluble in both water and oil; or (*d*) may be rendered substantially insoluble in both oil and water by ion exchange during the washing process. Various changes in the procedures and proportions specified may be made within the scope of the appended claims. While a preferred embodiment of the invention has been shown and described, it will be understood that various modifications can be made therein within the scope of the invention and such modifications are intended to be covered by the appended claims.

What we claim as new and desire to secure by Letters Patent of the United States is:

1. A process for treating petroleum residual oil which contains at least one impurity selected from the class consisting of sodium, vanadium, and calcium salts, which process consists of the steps of (1) washing said oil with an aqueous solution having a magnesium salt dissolved therein in sufficient concentration to provide a solution having a specific gravity greater than that of said oil, whereby magnesium ions replace a large portion of the sodium and calcium ions in said oil and whereby a two-phase mixture is obtained with said oil as the lighter phase and with an aqueous solution as the heavier phase and (2) separating said lighter phase from said heavier phase.

2. The process of claim 1 in which the magnesium salt is magnesium sulfate.

3. A process for treating petroleum residual oil which contains at least one impurity selected from the class consisting of sodium, vanadium, and calcium salts, which process consists of the steps of (1) washing said oil with an aqueous solution having a magnesium salt dissolved therein in sufficient concentration to provide a solution having a specific gravity greater than that of said oil and in the range of from about 1.02 to 1.20, whereby magnesium ions replace a large portion of the sodium and calcium ions in said oil and whereby a two-phase mixture is obtained with said oil as the lighter phase and with an aqueous solution as the heavier phase and (2) separating said lighter phase from said heavier phase.

4. The process of claim 3 in which the magnesium salt is magnesium sulfate.

5. A process for treating petroleum residual oil which contains at least one impurity selected from the class consisting of sodium, vanadium, and calcium salts, which process consists of the steps of (1) washing said oil with an aqueous solution having a magnesium salt dissolved therein in sufficient concentration to provide a solution having a specific gravity greater than that of the residual oil, whereby magnesium ions replace a large portion of the sodium and calcium in said oil and whereby a two-phase mixture is obtained with said oil as the lighter phase and with an aqueous solution as the heavier phase and (2) centrifugally separating said two-phase mixture whereby a substantially purified residual oil phase is obtained which is suitable for use as a fuel oil.

6. Apparatus for removing metallic and other ash forming constituents from petroleum fuel oils comprising a source of oil to be treated, a mixing tank connected to receive oil from said source, means for supplying to the oil in the mixing tank an aqueous solution of an alkaline earth salt having a specific gravity greater than that of the oil, means for supplying to the oil in the mixing tank an emulsion breaker, a first centrifuge, first conduit means for supplying the oil-wash water mixture from the mixing tank to the first centrifuge, a second centrifuge, second conduit means for supplying lighter components of the mixture from the first centrifuge to the second centrifuge, a settling tank, a chamber adjacent the settling tank having an outlet at the top thereof for decanting oil into the chamber, third conduit means for returning lighter components of the mixture from the bottom of the chamber to the first centrifuge, fourth conduit means for removing wash solution and impurities from the bottom of the settling tank, regulating means for maintaining at a preselected intremediate level in the settling tank the interface zone separating the lighter oil-containing components of the mixture in the upper part of the settling tank from the heavier wash solution in the lower part of the settling tank, and fifth conduit means for receiving the heavier components of the mixture separated in both said centrifuges and including means for discharging said heavier components into the settling tank at a level just below said interface zone.

7. Apparatus for the treatment of residual fuel oil comprising a mixing tank, means for supplying residual fuel oil to said mixing tank, means for supplying an emulsion breaker to said tank, means for supplying to said mixing tank an aqueous magnesium salt solution having a specific gravity greater than that of said oil, a first centrifuge, a settling tank, a first conduit extending from a peripheral portion of said first centrifuge to the lower portion of said settling tank, a second centrifuge, a second conduit from a central portion of said first centrifuge to said second centrifuge, a third conduit from the peripheral portion of said second centrifuge to the lower portion of said settling tank, a storage tank, a fourth conduit for the delivery of treated oil from a central portion of said second centrifuge to said storage tank, said settling tank being adapted to receive sludge from said first centrifuge and said second centrifuge whereby an upper oil layer and a lower sludge layer are formed in said settling tank, means responsive to the level of the interface between said oil layer and said sludge layer for removing sludge from the bottom of said settling tank, a chamber adjacent said settling tank and connected at the upper portion thereof to the upper portion of said settling tank whereby oil from said settling tank enters said chamber, and a fifth conduit connecting said chamber to said first centrifuge whereby oil is recirculated from said chamber to said first centrifuge.

References Cited in the file of this patent

UNITED STATES PATENTS

| | | |
|---|---|---|
| 1,686,491 | Hughes et al. | Oct. 2, 1928 |
| 1,741,756 | Clark | Dec. 31, 1929 |
| 1,968,397 | Howes | July 31, 1934 |
| 2,314,257 | Vaughan et al. | Mar. 16, 1943 |
| 2,365,256 | Edvarsson | Dec. 19, 1944 |
| 2,572,425 | Andersson | Oct. 23, 1951 |

OTHER REFERENCES

Sachanen: Conversion of Petroleum, 2d ed., Reinhold Publishing Co., New York., 1948, p. 295.